Aug. 21, 1956 D. H. ANDREWS ET AL 2,760,151

CATHODE RAY TUBE TEST CIRCUIT

Filed June 16, 1954 5 Sheets-Sheet 1

INVENTORS.
DAVID H. ANDREWS
PAUL R. LIEGEY
SEYMOUR NOZICK
WERNER S. TREITEL

BY George Sipkin
Lee J. Huntzberger
ATTORNEYS

CATHODE RAY TUBE TEST CIRCUIT

Filed June 16, 1954 5 Sheets-Sheet 2

INVENTORS.
DAVID H. ANDREWS
PAUL R. LIEGEY
SEYMOUR NOZICK
WERNER S. TREITEL

BY George Lipkin
Lee J. Huntzberger
ATTORNEYS

CATHODE RAY TUBE TEST CIRCUIT

Filed June 16, 1954 5 Sheets-Sheet 3

INVENTORS.
DAVID H. ANDREWS
PAUL R. LIEGEY
SEYMOUR NOZICK
WERNER S. TREITEL
BY George Lipkin
Lee J. Huntzberger
ATTORNEYS

CATHODE RAY TUBE TEST CIRCUIT

INVENTORS.
DAVID H. ANDREWS
PAUL R. LIEGEY
SEYMOUR NOZICK
WERNER S. TREITEL
BY George Sipkin
Lee P. Huntberger
ATTORNEYS INVENTORS.
DAVID H. ANDREWS
PAUL R. LIEGEY
SEYMOUR NOZICK
WERNER S. TREITEL
BY George Sipkin
Lee D. Huntzberger
ATTORNEYS United States Patent Office 2,760,151

Patented Aug. 21, 1956

2,760,151

CATHODE RAY TUBE TEST CIRCUIT

David H. Andrews, Glen Cove, and Paul R. Liegey, Seymour Nozick, and Werner S. Treitel, New York, N. Y.

Application June 16, 1954, Serial No. 437,308

8 Claims. (Cl. 324—23)

Figure 1:
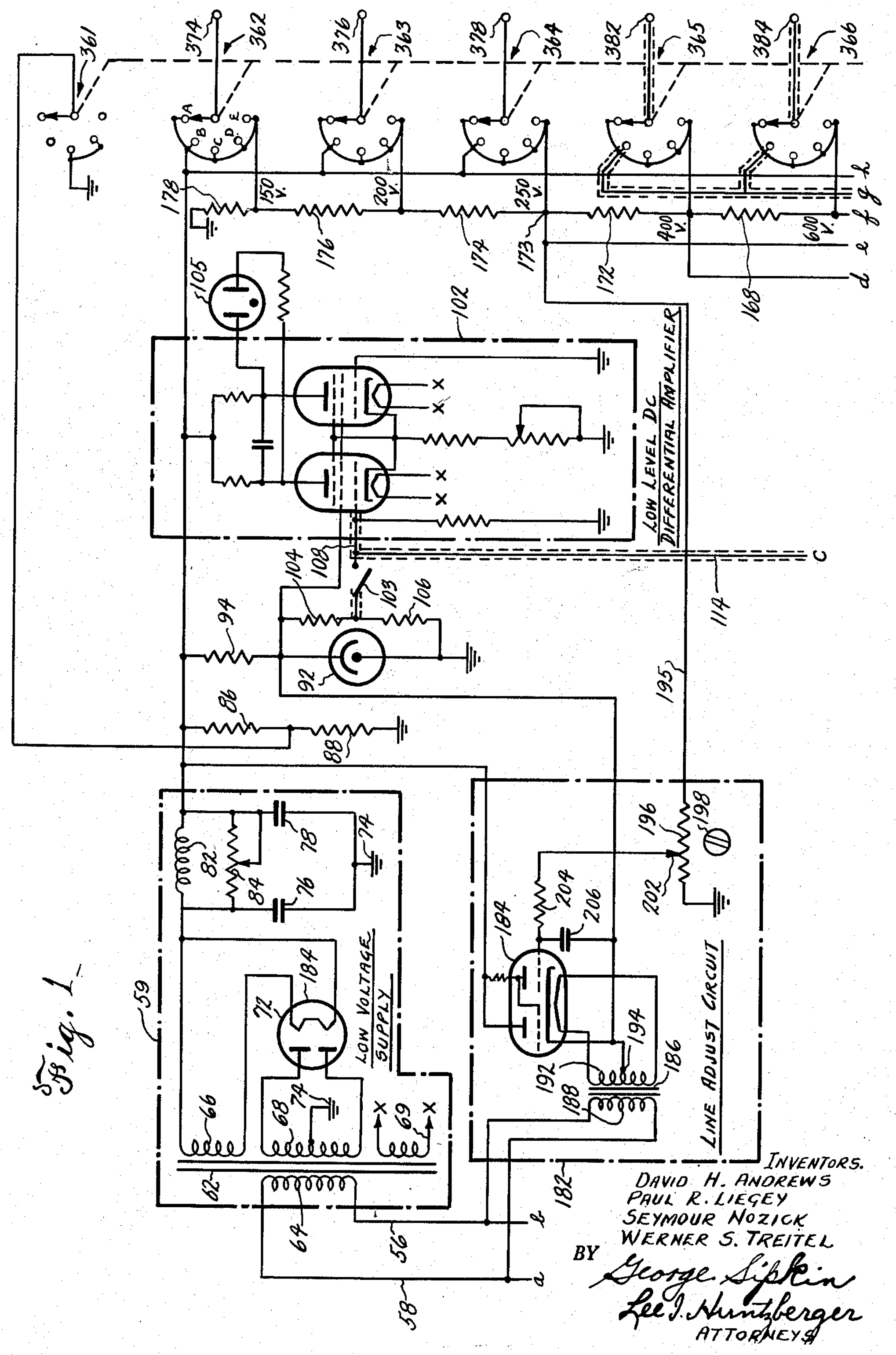
Figure 2:
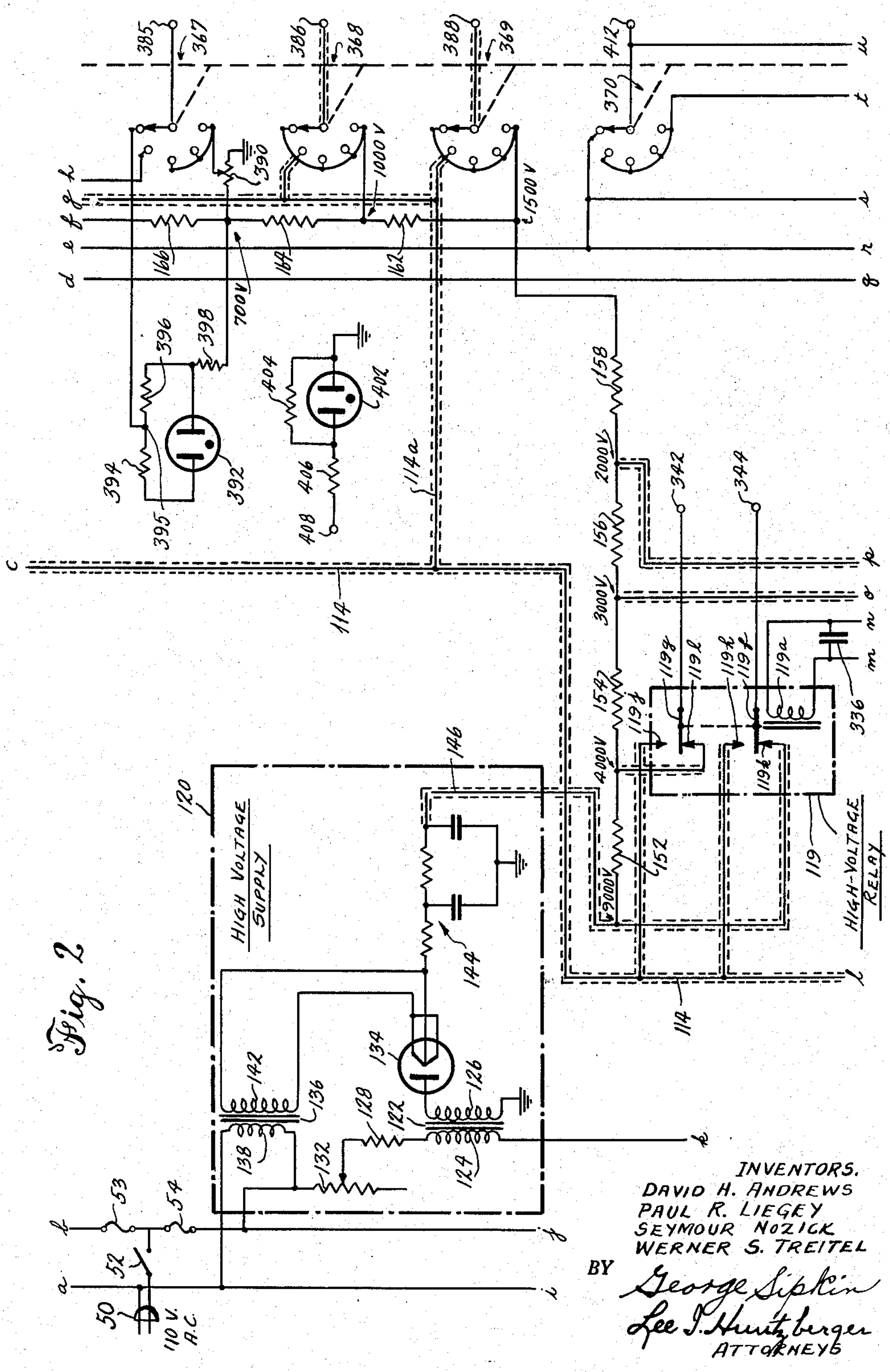
Figure 3:
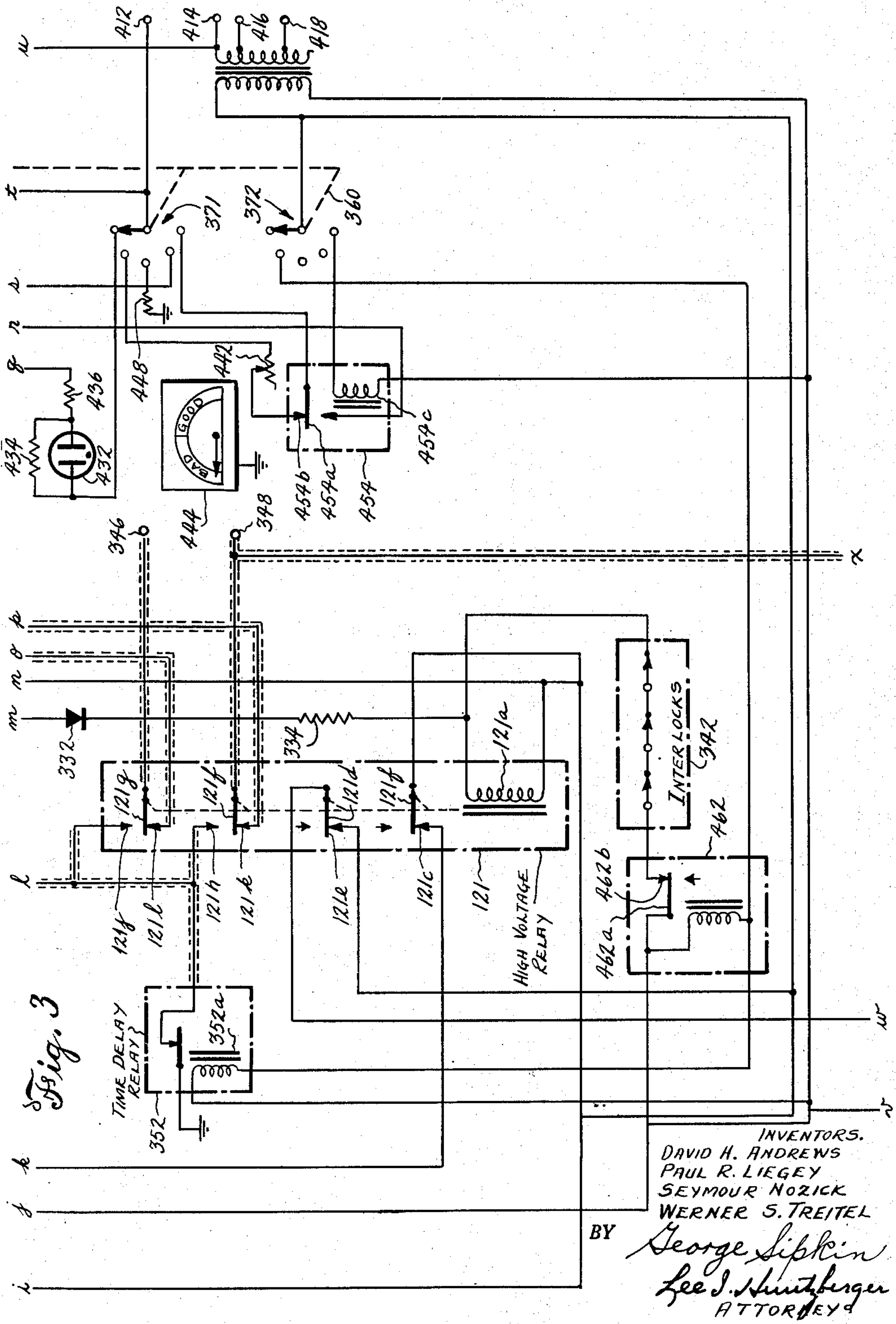
Figure 4:
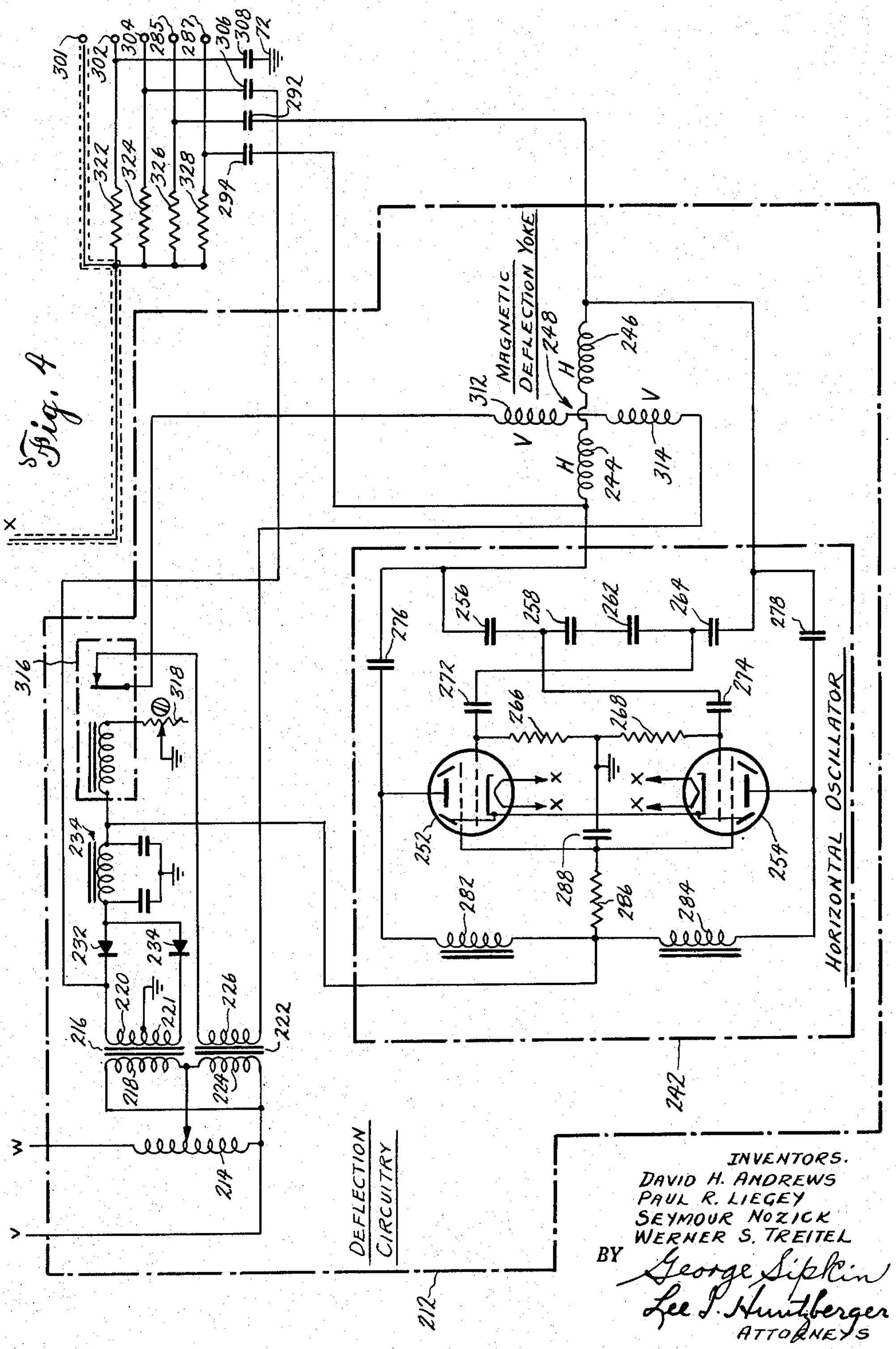

(Granted under Title 35, U. S. Code (1952), sec. 266)

The invention described herein may be manufactured and used by or for the Government of the United States of America for governmental purposes without the payment of any royalties thereon or therefor.

This invention relates to a cathode ray tube test circuit and more particularly to a universal cathode ray tube test circuit adapted to test the efficacy of both electrostatic and electromagnetic cathode ray tubes for emission, cutoff, screen operation and focus and to advise as to whether there are short circuits between tube electrodes and whether the gas content within the envelope of the tube is excessive.

In the prior art there is nothing approaching a universal cathode ray tube tester. Test circuits for single types of tubes and/or for limited kinds of tests are generally representative of the prior art.

This invention is directed to a universal cathode ray tube test circuit which is adapted for operation by unskilled personnel. A five-position switch conditions the test circuit for the various tests. Several circuit adjustments are included, but they are of a minor nature. The circuit includes a low voltage power supply and a high voltage power supply. The focus coil for use with electromagnetic cathode ray tubes is included in the low voltage supply as part of the filter circuit. The output of the high voltage supply is connected across a tapped sectional bleeder resistor for affording a plurality of potentials scaling downward from the voltage at the output of the high voltage supply to low potentials. To assure proper operation of the test circuit, a line-adjust circuit having a tuning eye tube is included for use in connection with the adjustment of the high voltage supply so that the output potential of the high voltage supply is adjustable to the same level over a wide range of voltages across the input supply line. For electrostatic tubes, one of the taps of the bleeder resistor is connected in circuit with a potentiometer to afford selectively variable electrostatic focusing potential. Correspondingly, for electromagnetic tubes, a rheostat is connected in shunt across the focus coil so that the current through the focus coil may selectively be varied over a range. The test circuit further includes deflection circuitry for use with either electromagnetic or electrostatic cathode ray tubes. The vertical deflection energy is derived from transformer means connected directly across the input power supply line. A single, variable autotransformer is provided at the input end of the deflection circuitry for controlling the deflection voltage amplitude presented to both electrostatic deflection plates and electromagnetic deflection coils. The deflection circuitry includes a magnetic deflection yoke, whose vertical deflection coils are connected across the output of a transformer; the input to the transformer is controlled by the variable autotransformer. A safety cut-out relay is included in circuit with the vertical deflection windings to avoid damage to the latter when the tube under test is an electrostatic tube and the variable autotransformer at the input end of the deflection circuitry is set up so as to provide an adequate voltage output for application to the vertical deflection plates of the electrostatic cathode ray tube. The horizontal deflection energy is obtained from a push-pull oscillator powered from the same transformer which supplies the vertical deflection energy. The oscillator includes as part of its tank circuit, the horizontal coils of the magnetic deflection yoke. If the tube under test is an electrostatic tube, the voltage developed across the horizontal coils of the magnetic deflection yoke is applied to the horizontal deflection plates of the electrostatic tube. A multideck selector switch serves to complete the different test circuit combinations. The circuit includes indicator means for use in connection with short circuit tests. The indicator means are neon indicator bulbs or their equivalent which glow when there are short circuits between any adjacent electrodes, i. e., a short between the cathode and filament, a short between the cathode and the control grid, or a short between the control grid and screen grid where there is one, etc. The test circuit performs the gas test by applying an arbitrarily selected voltage, determined from empirical data (on the order of 350 volts), between the cathode and the focusing electrode if it is an electrostatic tube or between the cathode and the screen grid if it is an electromagnetic tube. The test circuit includes a meter with a fixed mark, which meter is connected in the cathode circuit during the gas test. The needle of the meter is adapted to be set at this mark by a series rheostat. By this means an arbitrarily selected amount of emission current is obtained for all tubes during the gas test. The aquadag of the tube to be tested is connected to the grid-leak input resistor of a low level direct current amplifier. All of the connecting leads associated with the gas test circuit are shielded to avoid stray pickup from other portions of the circuit. A neon indicator bulb or equivalent is connected to the output end of the differential amplifier and glows when gas content is excessive. Positive ions formed by collision of electrons sprayed into the tube envelope with gas molecules in the envelope of the tube are attracted in part to the aquadag of the tube and the resulting current flows through the input resistor of the direct current amplifier. During the cutoff test the test circuit applies a bias to the tube by raising the potential of the cathode to a relatively high positive level empirically determined to be adequate to cut off all tubes (e. g., 250 volts). During the emission test no bias is applied between grid and cathode of the tube. The meter used in the gas test is also in the emission test to indicate by means of a good-bad scale whether or not the emission level is adequate. A time-delay relay is included in the test circuit to function during the emission test whereby the test is terminated in a relatively short period of time (e. g., on the order of two seconds) to avoid damaging the tube. During the operate test, the deflection circuitry of the test circuit causes a raster to be produced. During this test the screen is examined for faults in the screen phosphor coating as indicated by dark spots or blemishes.

This invention for testing cathode ray tubes is based on several proven concepts. These concepts include the following:

*a.* Mechanical failure, broken glass and loose bases are best detected by visual observation.

*b.* Phosphor flaked off from the screen is best detected by observing a raster on the screen of the tube at rated operating potentials.

*c.* Shorted combinations of electrodes resulting from rough handling during which some of the aquadag coating becomes separated from the envelope and lodged between adjacent electrodes or shorts due to any other reason are most economically indicated by neon lamps in series with the tube electrodes and suitable sources of potential.

*d*. Insufficient emission is detectable by a direct current emission test.

*e*. Excessive gas in a tube envelope is most easily shown by an adaption of the "gas ratio test." To understand the "gas ratio test" assume a cathode ray tube containing some gas is subjected to operating conditions. Under operating conditions the electron beam collides with gas molecules, ionizing some of them. The positive gas ions are attracted to any negatively charged element in the tube. If this element is not floating, it will supply electrons to these ions. This transfer of electrons constitutes a current, which current is proportional to the number of gas molecules present inside the tube. This is defined as ion current. In order to get a measurable ion current, an electrode of large surface area is required. In cathode ray tubes the aquadag coating is the most suitable element. The quotient of ion current in microamperes and the beam current in milliamperes is called the "gas ratio" and is an indication of the amount of gas present in any cathode ray tube.

*f*. Migration of cathode material causing stray emission and poor cutoff characteristics is detectable by the cutoff test.

Throughout this description, specific components and specific potential levels are referred to for purposes of illustration in connection with one practical embodiment of this invention. It is to be understood that these specific recitations are not limitations in scope but merely illustrations. Potentials other than those indicated and component designs other than those described may be readily adapted to portions of this circuit without departing from the spirit of the invention.

This invention is adapted to be used most advantageously in combination with a cathode ray tube mount of the type disclosed in copending patent application Serial No. 429,412, filed May 12, 1954, for Cathode Ray Tube Mount by the same inventors. The preferred embodiment of the test circuit disclosed herein includes a plurality of terminals. These terminals are adapted to be connected to a master socket of the type indicated in the above-referred to copending application. Higher voltage terminals, which present special problems of insulation are adapted to be connected to separate connecting terminals such as those indicated in the bottom of the tube mount of the above-referred to copending application. If a master socket is used, suitably designed adaptors may be combined with the master socket for mounting corresponding ones of any one of a large number of different cathode ray tube types.

An object of this invention is to provide a cathode ray tube test circuit.

A further object is to provide a universal cathode ray tube test circuit.

A further object is to provide a universal cathode ray tube test circuit operable by unskilled personnel.

A further object is to provide a universal cathode ray tube test circuit adapted for mass testing.

A further object is to provide a cathode ray tube test circuit adapted to perform tests both on electrostatic and electromagnetic cathode ray tubes.

A further object is to provide a cathode ray tube test circuit for performing tests on either electrostatic or electromagnetic cathode ray tubes under actual operating conditons.

A further object is to provide a cathode ray tube test circuit for electrostatic and electromagnetic tubes for performing short circuit tests, a gas test, a screen or operate test, a cutoff test, and an emission test.

A further object is to provide a universal cathode ray tube test circuit safely operable by unskilled personnel and adapted to be adjusted for proper operation without resort to the discretion of operating personnel.

Other objects and many of the attendant advantages of this invention will be readily appreciated as the same becomes better understood by reference to the following detailed description when considered in connection with the accompanying drawings wherein:

Figs. 1–4 comprise a composite schematic wiring diagram of a preferred embodiment of this invention.

Figure 5:
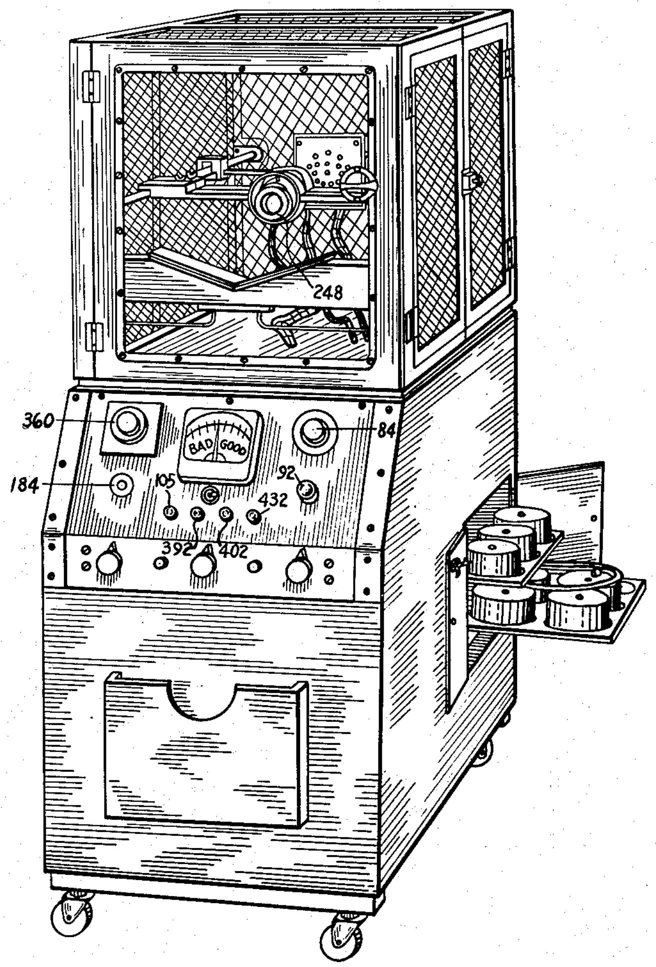

Fig. 5 is a perspective view of a tester having a universal tube mount and adapted to embody the test circuit of this invention.

A preferred embodiment of the test circuit is shown on the drawings and includes a connecting plug 50 adapted to be plugged into an alternating current lighting circuit operating at about 110 volts. In series with the plug 50 is a main switch 52. A supply line 56—58 extends from the plug 50 and includes fuses 53 and 54.

A low voltage supply circuit 59 (e. g., output of about 350 volts) is connected across the fused supply line, 56—58 extending from the power input plug 50. The low voltage supply includes a transformer 62 having a primary winding 64 and secondary windings 66 and 68; the latter windings are connected in circuit with a full-wave rectifier 72. The filaments of the full-wave rectifier 72 are connected directly across the secondary winding 66. The plates of the full-wave rectifer 72 are connected to opposite ends of secondary winding 68. The secondary winding 68 is provided with a center-tap terminal connected to a source of reference potential hereinafter referred to as ground 74. The output of the full-wave rectifier 72 is filtered by a pi-filter including condenser 76, condenser 78, and the magnetic focus coil 82 of the test circuit. The focus coil 82 is shunted by a rheostat 84 connected across the focus coil 82. The current is the focus coil 82 is adjustable by setting the tap on the rheostat 84. A two section bleeder including a pair of series-connected resistors 86 and 88 are connected between the output low voltage supply 59 and ground. Bleeder resistors 86 and 88 serve the conventional purposes of discharging the filter condensers 76 and 78 and improving the regulation of the low voltage supply 59. Another purpose is to permit enough current to flow through the focus coil. Additional current flow in the focus coil occurs when the resistor 88 is shorted during the operate and cutoff tests.

Also connected between the output of the low voltage supply 59 and ground is a voltage reference source including limiting resistor 94 and voltage regulating tube 92.

A low level direct current differential amplifier 102, including two pentodes (e. g., 6AC7) whose filaments are connected across secondary 69 is provided for use during the gas test function of the test circuit. The differential amplifier 102 is conventional. Use is made herein of its good stability and gain. The input grid of the differential amplifier 102 is adapted to be connected through a normally open switch 103 in circuit with connecting lead 108 to the junction between a pair of precision resistors 104 and 106 comprising a voltage divider. The voltage divider including precision resistors 104 and 106 is connected across the voltage regulator gas tube 92. When it is desired to calibrate differential amplifier 102, push-button switch 103 is actuated, closing the circuit between the input of the differential amplifier 102 and the source of reference potential provided by the junction between the precision resistors 104 and 106 connected across the voltage regulator gas tube 92. The gain of the differential amplifier is adapted to be adjusted by means of the potentiometer in its cathode circuit. The gain of the differential amplifier 102 is adapted to be adjusted by means of the potentiometer in its cathode circuit until the neon indicator bulb 105 connected to the output of the differential amplifier 102 just glows. At that time the differential amplifier is ready for performing the gas test on a cathode ray tube in a manner subsequently described. A shielded lead 114 is adapted to connect the aquadag coating of a cathode ray tube under test to the input resistor of the differential amplifier 102.

The test circuit includes a high voltage supply 120. The high voltage supply 120 includes a high voltage transformer 122 having a primary winding 124 and a secondary winding 126. The primary winding 124 of the high voltage transformer 122 is connected in series with a fixed resistor 128 and a rheostat 132 and a fused power supply, 110 volt A. C. and one section of a high voltage relay 121. By adjusting rheostat 132 the current through primary winding 124 may be varied between limits corresponding to line voltage variations. The fixed resistor 128 limits the range of current adjustment in primary winding 124. The magnitude of the alternating current output voltage developed across secondary winding 126 of the high voltage transformer 122 is ten thousand volts, which is in accordance with maximum operating potentials required for present day cathode ray tubes. Design for higher voltage is within the scope of this invention. One end of secondary winding 126 is connected to ground. The opposite end of secondary winding 126 is connected to the plate of a half-wave high-vacuum rectifier 134 (e. g., 8O13 or 3B24, the latter being smaller and having the centertapped filament). A separate filament transformer 136 is provided for supplying the required heating energy for the filament cathode of the half-wave high-vacuum rectifier 134. The primary winding 138 of the filament transformer 136 is connected directly across the fused supply line 56—58. The secondary winding 142 of the filament transformer 136 is connected at one end to the centertap of the filament of the half-wave high-vacuum rectifier 134, and at its other end to both ends of the filament of the rectifier 134. Both transformers 122 and 136 are insulated for operation at twenty thousand volts root-mean-square. Because of the importance of good regulation in the test circuit, resort is had to overdesign. A pi-filter with a resistive input generally indicated by the reference character 144 is connected between the centertap of the filament of rectifier 134 and ground. The output terminal of the filter 144 is connected to a shielded lead 146. It is assumed for purposes of this description that the rheostat 132 is properly adjusted when the potential of shielded lead 146 is raised 9,000 volts above ground. A multitap bleeder comprising series-connected accurate and stable resistors 152, 154, 156, 158, 162, 164, 166, 168, 172, 174, 176 and 178 is connected to the output end of the filter 44 through shielded lead 146. The opposite end of the bleeder is connected directly to ground. Metallized resistors of adequate power rating are preferable to carbon resistors since the latter drift especially under continuous operating conditions. The junction between the adjacent pairs of resistors in the bleeder afford a range of voltages from which may be selected those operating voltages necessary for performing a test on a particular cathode ray tube.

A line-adjust indicator circuit 182 powered by low voltage supply 59 is provided for aiding in adjusting the output voltage of the high voltage supply 120. The line adjust indicator circuit 182 includes a tuning eye tube 184. It shows by means of a shadow on its fluorescent target the difference in voltage between its grid and its cathode. The tuning eye tube 184 shown herein is a 6E5 which includes a triode section for amplification built into the tube. A separate filament transformer 186 is provided for supplying the heating energy for the filament of the tuning eye tube 184 because of the need to raise the secondary to a fixed potential above ground. The filament transformer 186 includes a primary winding 188 connected directly across the fused supply line 56—58. Opposite ends of the secondary winding 192 of the filament transformer 186 are connected directly to opposite ends of the filament of the tuning eye tube 184. The secondary winding 192 is provided with a centertap terminal 194. The centertap terminal 194 of the secondary winding 192 is connected to the anode end of the voltage regulator gas tube 92 and is retained thereby at a fixed direct current potential with respect to ground, which potential is the reference voltage for the tuning eye tube 184. The tuning eye tube 184 serves to compare the voltage developed at the tap between the resistors 172 and 174 of the bleeder (which voltage is a fixed fraction of the output voltage of the high voltage supply 120) with the reference voltage derived from the anode end of the voltage regulator gas tube 92. A lead 195 connects the tap 173 between the bleeder resistors 172 and 174 to one end of the resistor of potentiometer 196, the opposite end of the resistor being connected directly to ground. The potentiometer 196 is of the factory adjustable type including a screw-adjustment means 198 for positioning the tap 202. The potential of tap 202 above ground is presented to the input of the tuning eye tube 184. Resistor 204 and capacitor 206 serve to additionally filter the input voltage from 173 and to eliminate tuning eye tube flicker. The cathode of tuning eye tube 184 is held at 150 volts and the potentiometer 196 is so adjusted that when the high voltage supply 120 delivers 9000 volts (250 volts between bleeder resistors 172 and 174), the input grid of the tuning eye tube is at 142 volts with respect to ground or minus 8 volts with respect to the cathode, thus showing no shadow angle on the tuning eye tube 184. At desired intervals the high voltage supply 120 is calibrated by adjusting the rheostat 132 of the high voltage supply to that point which defines the dividing line between no shadow angle and the beginning of a shadow angle on the tuning eye tube 184. The size of the shadow is inversely proportional to the bias voltage. Thus the tube shows zero shadow angle with a bias of −8 volts and 90° angle with zero bias.

The high voltage wiring such as the shielded lead 146 extending from the output of the high voltage supply 120 requires special consideration. In part, this is due to the fact that all connections to be made to the aquadag of the cathode ray tube to be tested have to be shielded against stray pickup. This is necessary since the aquadag of the tube to be tested is in the gas test circuit as is more completely described in the subsequent portions of this specification. Shielding is necessary because the gas test is performed at a very low voltage level. Stray pickup would seriously hamper the performance of this test. Leads not carrying voltages over 1500 volts comprise stranded and tinned conductor covered by a layer of rubber in turn encased in thin tinned copper braid and insulated with an outer layer of rubber. Between 1500 and 4000 volts standard coaxial cable (e. g. Amphenol RG–8/U) is found most desirable. Special treatment is needed for the 9,000 volt wiring. This 9,000 volt shielded wiring may be constructed from Rome Neon Sign Cable type OG15 made by Consolidated Wire and associated companies. Any equivalent that can withstand about 20,000 volts direct current in suitable. The cable is covered with copper braid and wrapped with special high voltage tape—"Scotch" Electrical Tape #33 made by Minnesota Mining and Manufacturing Company. Wherever non-shielded high voltage wiring is used in the circuit, Rome Neon Sign Cable OG15 is preferred because it is readily available and stands up under continuous operation. The wiring further requires special care to prevent corona. All sharp points and jagged edges are coated with a smooth ball of solder, or carefully polished with fine sandpaper.

The test circuit further includes deflection circuitry 212 for both electrostatic and electromagnetic tubes. The deflection circuitry 212 includes a variable autotransformer 214 adapted to be connected directly to the fused supply line 56—58 through one switching section of the high voltage relay 121. When the coil of the high voltage relay 121 is energized the coil of the variable autotransformer is connected across the fused supply line 56—58. The oscillator 242 in the deflection circuit 212 includes a pair of power tubes 252 and 254 (e. g., 6L6) whose filaments are connected directly across the secondary winding 69 of the transformer 62 in the low voltage power supply 59. The oscillator circuit utilizes the horizontal windings 244 and 246 of the deflection yoke 248 as its tank inductance.

The reactive current through these horizontal windings is more than enough to deflect the beam of cathode ray tubes with larger screens. Feedback is accomplished by means of a double capacitive divider comprising four capacitors 256, 258, 262, and 264. Grid-leak biasing resistors 266 and 268 are provided for the tubes 252 and 254, respectively. Coupling condensers 272 and 274 are connected between the control grids of the respective tubes and the feedback taps of the capacitive divider. Condensers 276 and 278 are provided for the purpose of blocking the direct current plate potential from deflection yoke windings. Two chokes 282 and 284 are provided for assuring enough filtering to prevent possible plate modulation by the power line frequency. The resistor 286 and the condenser 288 are the screen dropping resistor and the screen bypass condenser, respectively, for the tubes 252 and 254. The oscillator circuit components are not cirtical with the exception of the four tank condensers 256, 258, 262, and 264. It is essential that they be matched in pairs, for example, condensers 256 and 264 must have equal capacities and condensers 258 and 262 must have equal capacities to an extent greater than just nominal values. This matching may be achieved through the use of an impedance bridge. The horizontal oscillator 242 is powered from the output of the filter 234. The voltage amplitude developed by the horizontal oscillator is controllable by varying the output of the autotransformer 214. Because the reactive current through the horizontal windings 244 and 246 of the deflection yoke 248 is very high, the voltage developed across these windings is also very high. The voltage developed across these windings is adequate to supply the electrostatic deflection energy for electrostatic tubes. Therefore, both magnetic and electrostatic horizontal deflection is obtained from one source. The electrostatic horizontal deflection terminals of the test circuit are indicated at 285 and 287 being coupled through condensers 292 and 294, respectively, to opposite ends of the series connected horizontal windings 244 and 246.

The test circuit supplies electrostatic vertical deflection energy in the form of a 60 cycle sinusoid. The 60 cycle sinusoid is developed across the electrostatic vertical deflection terminals 302 and 304 which are adapted to be connected to the vertical deflection plates of the electrostatic tubes. The terminals 302 and 304 are capacity coupled by means of condensers 306 and 308 across the upper half of the secondary winding 220 of the power transformer 216.

The magnetic deflection yoke 248 also includes a pair of series connected vertical deflection windings 312 and 314. The deflection energy for the vertical deflection windings is obtained from the secondary winding 226 of the transformer 222. The vertical deflection windings 312 and 314 require a source of relatively high current but low voltage. To serve this purpose the transformer 222 may be a filament transformer. Connected in series between the secondary winding 226 of the transformer 222 and the vertical deflection windings 312 and 314 are the normally closed contacts of a relay 316. The relay 316 serves as an over voltage safety device for the vertical deflection windings 312 and 314. For example, when an electrostatic tube is being tested by the test circuit, the tap of the variable autotransformer 214 has to be set in a relatively high voltage position in order to obtain sufficient vertical deflection. If the vertical deflection windings 312 and 314 are not disconnected from the secondary 226 of the transformer 222 when the tap of the autotransformer is moved to the high voltage position, the vertical deflection windings would become overloaded. To protect against this, the coil of the relay 314, connected in series with an adjustable rheostat 318, is connected between the output of the filter 234 and ground. The rheostat is properly adjusted so that the relay 316 disconnects the vertical deflection windings 312 and 314 from the secondary 226 at a value slightly higher than that required to produce deflection of electromagnetic tubes having the largest screen diameters to be tested by this circuit.

If the deflection plates of an electrostatic cathode ray tube are operated without a direct current return to ground, some of the beam electrons are collected by the plates causing the plates to develop a negative electrostatic charge. This electrostatic charge sets up a field around the plates which tends to cut off the electron beam. To avoid this, there is provided for each electrostatic deflection plate a return to a source of direct current potential. This is accomplished by means of resistors 322, 324, 326, and 328 in series with the bleeder tap between resistors 156 and 158 and each of the electrostatic deflection plate terminals 302, 304, 285, and 287, respectively. The aforementioned condensers 294, 292, 306, and 308, serve as direct current blocking condensers for keeping direct current potential out of the deflection circuit elements. By this arrangement the electrostatic charge is permitted to leak off the deflection plates of the electrostatic tubes.

High voltage switching is accomplished by means of a pair of high voltage relays 119 and 121. Relays 119 and 121 have a total of six contactors. The contactors of both relays move in unison. The reason for two relays instead of one relay is that one relay insulated for handling six separate circuits each of which are insulated for very high voltage are neither commercially available nor practical. The size and weight would be excessive. The relay 119 is of the double-pole double-throw variety with its contacts insulated for 10,000 volts to ground and between each other; its coil **119*a* is operated by direct current and for this reason is connected in series with a selenium rectifier 332 and a current-limiting resistor 334. The coil 119*a* of the relay 119 is bridged by a filter condenser 336. The circuit of relay coil 119*a* and coil 121*a* are both adapted to be connected directly across the fused supply line 56—58. A plurality of interlock switches 342 are connected in series between the coils 119*a* and 121*a* and the fused supply line 56—58. The interlock switches 342 are adapted to be associated with the physical supporting structure of the test circuit. When any of the closures of the supporting structure of the test circuit are moved to open position, the respective interlock switch is caused to open in turn causing the relay coils 119*a* and 121*a*** to be deenergized.

When the relay coils are energized, the contactor **121*b* is in electrical engagement with the fixed contact 121*c*; this serves to complete the series connection between the primary winding 124 of the high voltage transformer 122 and the fused supply line 56—58. When the relay coil 121*a* is deenergized by opening any one of the interlock switches, the primary winding 124 is disconnected from the fused supply line 56—58, cutting out the high voltage supply 120. Correspondingly, contactor 121*d* and fixed contact 121*e* are in the energizing circuit of the variable autotransformer 214 of the deflection circuitry 212**.

When the relay coil 121 is energized the autotransformer coil is energized, and when the relay coil 121 is deenergized, the autotransformer coil is likewise deenergized. Therefore, all high voltages in the test circuit terminate when any of the interlock switches are opened. The remaining four contactors in the relays 119 and 121 are connected in circuit in a similar manner and function in a similar manner. The contactors **119*f*, 119*g*, 121*f*, 121*g*, are connected to high voltage output terminals 342, 344, 346 and 348, respectively. The upper contacts 119*h*, 119*j*, 121*h*, 121*j*, are connected in common by shielded leads 114, one end of the shielded lead 114 being connected to the input end of the differential amplifier 102 as previously indicated. Another end of the shielded lead 114 is normally grounded through the contact elements of time-delay relay 352. The shielded lead 114 is adapted to be disconnected from ground when the coil 352*a* of the relay 352 is energized. The relay 352 is a time-delay relay causing the grounded connection to persist for a short interval after the relay coil 352*a* is energized. A shielded lead branch 114*a* of the shielded lead 114 is adapted to be connected to the aquadag coating of the cathode ray tube under test. The lower contacts 119***k*, 119L, 121*k*, 121L are connected to four of the high voltage taps of the bleeder. Therefore, the high voltage terminals 342, 344, 346, and 348 are each connected in circuit with high voltage taps of the bleeder when the relay coils 119*a* and 121*a* are energized. When the relay coils 119*a* and 121*a* are deenergized, the high voltage output terminals are disconnected from their corresponding taps of the bleeder and instead are connected directly to ground through the relay 352. Unless action is taken to energize the relay coil 352*a* of the relay 352, the high voltage terminals continue to be disconnected from the bleeder and remain connected to ground.

Whereas the high voltage switching is accomplished by means of the relays 119 and 121, all of the low voltage switching is accomplished by means of a multideck switch 360 including six decks, each deck consisting of two single-pole five-throw non-shorting type switches. Each of the six switch decks are identical. The movable contactors of the decks are mechanically linked to move together. The decked switch 360 has five switching positions. The movable contactors of the multideck switch 360 assumes the position A for the short test, position B for the gas test, position C for the operate test, position D for the cutoff test, and position E for the emission test.

The switch deck 361 is out of the circuit during the short test, the gas test, and the emission test, which correspond to positions A, B, and E, respectively. During the operate and cutoff tests, which correspond to positions C and D, respectively, the contactor of the switch deck 361 is connected directly to ground. Since the contactor of the switch deck 361 is connected directly to the junction between bleeder resistors 86 and 88 at the output end of the low voltage supply, the switch deck 361 serves to short the resistor 88 during the operate and the cutoff tests for the purpose of increasing the current flowing through the focus coil which is in the low voltage circuit 59.

The contactors of the switch deck 362, 363 and 364 are connected to output terminals 374, 376 and 378, respectively. In all of the switch positions A, C, D, and E, corresponding to the short, operate, cutoff, and emission tests, respectively, the contactors of the switch decks 362, 363 and 364 are connected to the successive bleeder taps between bleeder resistors 176 and 178, between bleeder resistors 174 and 176, and between bleeder resistors 172 and 174. In the preferred embodiment of the invention referred to above, the foregoing taps are the 150 volt tap, the 200 volt tap, and the 250 volt tap, respectively. Any one of the three voltages from these taps are adapted to be applied to the screen grid of cathode ray tubes employing tetrode guns. During the position B which is the gas test position of the switch, each of the terminals 372, 374, and 376 are connected to the output of the low voltage supply 59, which operates at 350 volts.

The switch decks 365, 366, 368, and 369 are connected in a similar manner to the connections described for switch decks 362, 363, and 364. The contactors of each of the switch decks 365, 366, 368, and 369, are adapted to be connected to the aquadag. The fixed contacts of the switch decks 365, 366, 368, and 369, which correspond to positions A, C, D, and E, for the short, operate, cutoff, and emission tests, respectively, are connected in common in each of the switch decks and are connected to successively higher voltage taps of the bleeder. For example, the four fixed contacts of switch deck 365 are connected to the junction between bleeder resistors 168 and 172 which affords the 400 volt tap. The four fixed contacts connected in common of switch deck 366 are connected to the junction between bleeder resistors 166 and 168 which affords the 600 volt tap. The four fixed contacts connected in common of the switch deck 368 are connected to the junction between bleeder resistors 162 and 164 which affords the 1,000 volt tap. The four fixed contacts connected in common of switch deck 369 are connected to the junction between bleeder resistors 158 and 162 which affords the 1500 volt tap. Connection is adapted to be made between any one of the contactors of the switch decks 365, 366, 368, and 369, to the aquadag of the tube under test through one of the output terminals 382, 384, 386, and 388, respectively. All the leads extending from the contactors to the corresponding terminals of the four switch decks in the accelerating anode section are shielded. In position B of the switch corresponding to the gas test, the contactors of the four switch decks are directly connected to the shielded lead 114 and 114*a* which, as indicated previously, extends at one end through a relay 352 to ground and at another end to the input of the direct current differential amplifier 102.

Higher voltages are not controlled by the switch 360 but instead are controlled by the relays 119 and 121 as previously described. The high voltage terminals are at 342, 344, 346 and 348, and likewise are adapted for connection to the aquadag coating of the cathode ray tube under test. In effect, any one of eight voltage levels may be selected for application to the aquadag of the cathode ray tube under test, depending upon the rating of the tube. The contactor of switch deck 367 is connected directly to output terminal 385. The output terminal 385 is adapted to be connected to the focusing electrode (the first anode) of electrostatic tubes. The fixed contacts of the switch deck 367 corresponding to the C, D, and E positions, which are the operate, cutoff, and emission test positions, are connected in common and are all connected to the arm of the potentiometer 390. One end of the resistor of the potentiometer 390 is connected directly to ground and the other end of the resistor is connected directly to the junction between bleeder resistors 164 and 166 which affords the 700 volt tap. The potentiometer 390 makes possible an adjustment anywhere between zero and 700 volts for application to the focusing electrode of the electrostatic tubes. In position A of the same switch deck, which position corresponds to the short test position, the focusing electrode of the electrostatic tube under test is adapted to be connected directly in circuit with an indicator bulb 392. Connected in shunt across the indicator bulb 392 are a pair of resistors 394 and 396, providing a tap 395 therebetween for connection to the short test contact of the switch deck 367. An additional resistor 398 is connected between the indicator bulb 392 and the 700 volt tap. Operation of this indicator bulb is described in the paragraph following. The B contact of the switch deck 367 is connected in common with the B contacts of the switch decks 362, 363, and 364, which are all connected to the output of the low voltage power supply.

Another short-test indicator bulb is shown at 402. One side of the indicator bulb 402 is connected directly to ground. The electrodes of the indicator bulb 402 are shunted by a resistor 404. The combination is connected in series with a current limiting resistor 406 and terminal 408. The terminal 408 is adapted to be connected to the control grid of the cathode ray tube under test. In the event there is a short between the control grid and the focusing electrode connected to the terminal 385 when the switch is in A position for the short test, both indicator bulbs 392 and 402 will glow. This is due to the fact that a series circuit is completed including the 700 volt tap, the indicator bulb 392, the focusing electrode connected to the terminal 385, the control grid connected to the terminal 408, the indicator bulb 402, and ground.

The contactors of the switch decks 370 and 371 are connected directly to the terminals 412 and 414, respectively, which are adapted to be connected to the heater common and the cathode, respectively, of the tube under test. The four contacts of the switch deck 370 corresponding to the B, C, D, and E, positions which are the gas test, operate, cutoff, and emission test positions, respectively, are connected in common and are connected to the contactor of the switch deck 371; the latter is adapted to be connected in circuit with the cathode of the cathode ray tube through the terminal 414. In the A position, which corresponds to the short test, the contactor of the switch deck 370 is connected to the junction between bleeder resistors 172 and 174, which affords the 250 volt tap. The other side of the heater filament is adapted to be connected to either the terminal 416 or the terminal 418. These terminals are at different potentials. The terminals 416 and 418 are connected to spaced taps on the secondary winding of a filament transformer 422 whose primary winding 426 is connected directly across the fused supply line 56—58. In the A position of the switch which corresponds to the short test, the contactor of the switch deck 371 is connected in circuit with another short circuit indicator bulb 432, shunted by a resistor 434, and connected in series with current limiting resistor 436. The other side of the current limiting resistor 436 in circuit with the indicator bulb 432 is connected to the 400 volt tap between the bleeder resistors 168 and 172. During the short test, if there is a cathode to grid short both the indicator bulbs 402 and 432 glow. This is due to the fact that a series circuit is completed which includes the cathode, the indicator bulb 432, the 400 volt tap of the bleeder, indicator bulb 402, its current limiting resistor 406, the control grid and back to the cathode of the tube. During the short test the heater filament is connected to the 250 volt tap of the bleeder. In the event there is a heater filament to cathode short, only the indicator bulb 432 glows. In that condition a series circuit is completed which includes the cathode to heater short, the 250 volt tap through the bleeder to the 400 volt tap, the indicator bulb 432, and back to the cathode. The B position contact of the switch deck 371 is connected in circuit with a rheostat 442 and a meter 444, the opposite end of which is connected directly to ground. During the gas test, the cathode is connected in circuit with one of the other electrodes of the gun through the low voltage supply and gas test calibrating meter 442. The meter 444 includes an indicator mark 446. The cathode current is adjusted during the gas test by means of the rheostat 442 until the pointer of the meter comes in registration with the gas-test indicating mark on the meter 444. With the circuit adjusted as previously described, the gas-test neon indicator bulb 105 glows if the tube under test is gassy; if it does not glow, the tube is not excessively gassy. When the contactor of the switch deck 371 is in the C position which corresponds to the operate test position, the cathode is connected through a cathode bias resistor 448 directly to ground. This affords the proper bias during the operate test during which a raster is produced on the face of the cathode ray tube. When the contactor of the switch deck 371 is in the D position which corresponds to the cutoff position, the cathode of the cathode ray tube under test is connected to the 250 volt tap of the bleeder. With this bias on the cathode ray tube, if the tube is in good shape, it cuts off. In the E position of the contactor, which is the emission test position, the cathode of the cathode ray tube under test is connected to a contactor 454A of a time delay relay 454. Normally the contactor 454A of a relay 454 is in engagement with the fixed contact 454B. When the coil 454C of the relay 454 becomes energized, contactor 454A moves into engagement with the opposite contact 454D.

The switch decks 371 and 372 have to be considered together during the emission test. When the contactors of the switch 360 are moved into the E position for the emission test, the relay coil 454C is connected across the fused supply line 56—58 through the switch deck 372. The coil is energized after a suitable time delay for moving contactor 454A out of engagement with the contact 454B and into engagement with contact 454D. Instantaneously after switching into the emission test position, there is substantially no bias on the tube under test since the meter 444 represents a very low resistance. Emission is very high and is indicated on the meter 444. To prevent damage to the tube, the time delay relay 454 is adapted to cut off the tube a period of time on the order of two seconds. During this period of time the meter pointer will come to a stop either in the portion of the meter scale marked bad or will move into the portion of the meter scale marked good to indicate whether or not the emission of the tube under test is adequate. At the end of the time delay interval approximating two seconds, the coil 454C becomes energized by conventional means, not shown, on the drawing and the cathode is raised to a potential of 250 volts which acts to immediately cut off the tube.

The switch deck 372 is inactive in the A, C, and D positions which correspond to the short, operate, and cutoff tests. During the E position, switch deck 372 is active to actuate the time delay relay 454 for limiting the period during which high emission current is drawn from the cathode of the tube under test. In the B position the contactor acts to complete a circuit to the relay 462. Contactor 462A and the fixed contact 462B of the relay 462 are adapted to be in series with the interlock switches 342 and the energization circuit of the coils of the high voltage relays 119 and 121. When the coil of the relay 462 is energized the coils 119A and 121A of the high voltage relays are deenergized cutting off the high voltage supply during the gas test. Voltage for the gas test is obtained from the low voltage supply 59.

In operation the circuit is made ready for use by connecting the plug 50 to a suitable outlet of an alternating current lighting supply. The main switch 52 is closed. To adjust the output voltage of the high voltage supply 120 to that necessary for proper operation, the rheostat 132 is adjusted so as to just eliminate any shadow angle on the tuning eye tube 184 of the line-adjust circuit 182. By this means, the high voltage supply is adjusted to compensate for different voltages applied to the terminals of the plug 50 by the same or different alternating current lighting supplies. If an electrostatic tube is being tested, the connections are made as follows: The cathode of the electrostatic tube is connected to the terminal 414. A common terminal of the heater filament is connected to the terminal 412. The other terminal of the heater filament is connected either to the terminal 416 or to the terminal 418, depending upon the operating voltage required for the particular tube under test. The control grid on the electrostatic tube is connected to the terminal 408. This in effect serves to connect a grid-leak resistor to the control grid of the electrostatic tube. The focusing anode of the electrostatic tube is connected to the terminal 385. The vertical deflection plates of the electrostatic tubes are connected to the terminals 302 and 304, respectively. The horizontal deflecting plates of the electrostatic tube are connected to the terminals 285 and 287, respectively. It is to be noted that thus far the only choice of terminals was in selecting the proper terminal for the heater so as to afford the proper heater voltage. The only other choice to be made among the remaining terminals is the proper accelerating voltage for the accelerating anode or anodes. This selection is made from among the terminals 382, 384, 386, 388, 301, 342, 344, 346, and 348. When electrostatic tubes are tested the terminals 374, 376, 378 are not in the circuit at all. The test circuit may be readily designed to afford either a larger or a smaller number of terminals adapted for connection to the accelerating anode or anodes of cathode ray tubes depending upon the range of types or sizes to be accommodated by the test circuit. After the anode(s) is connected, the tube is ready for test. The tube ordinarily is included in a cage for safety purposes. The circuit is conditioned for operation when the cage is properly closed for closing the interlock switches 342. When the contactors of the selector switch 360 is moved into the position A, the circuit is conditioned for the short test. Under this condition, the heater and the cathode of the tube under test are not connected directly to one another, but instead the heater is raised to a positive potential and the cathode is raised to a still higher positive potential, high enough so that in the event there is a short either between the cathode and the heater filament or the cathode and the control grid, a circuit will be completed through one of the indicator bulbs 402 and 432 to cause the appropriate indicator bulb above to glow. Correspondingly, if there is a short between the control grid and the focusing anode of the tube under test, a circuit is completed through the indicator bulbs 392 and 402 by virtue of the difference of potential between the two electrodes as represented by the voltage developed across the section of the bleeder resistor including the resistors 166 and 168. During the short test the accelerating anode(s) is at operating potential. In the event there is a short in the focusing electrode and the accelerating anode(s), the indicator bulb 392 glows. This test is performed substantially instantaneously and requires no special adjustments.

When the contactors of the selector switch 360 are positioned into the B position, the test circuit is conditioned for the gas test. During the gas test the high voltage power supply 120 is cut off. This is accomplished by means of the switch deck 372 which acts to complete the energizing circuit of the coil of the relay 462. When the coil of the relay 462 is energized, the energizing circuit to the coils 121*a* and 119*a* of the high voltage relays 119 and 121 are interrupted. Under this condition, contactor 121*b* separates from the contact 121*c* of the relay 121 whereby the primary winding 124 of the transformer 122 is disconnected from the fused supply line 56—58. Furthermore, during the gas test the deflection circuitry is deenergized. This is also accomplished when the energizing circuit for the coil 121*a* of the relay 121 is interrupted. When the energizing circuit of the coil 121*a* is interrupted the contactor 121*b* separates from the fixed contact 121*e* which breaks the continuity between the coil of the variable autotransformer 214 and the fused supply line 56—58. Therefore, during the gas test both the high voltage supply 120 and the deflection circuit 212 both become inoperative. The heater filament is connected to the cathode by means of the switch deck 370. The control grid remains connected to ground through the grid-leak resistors 404 and 406. The focusing electrode is connected by means of switch deck 367 to the output of the low voltage supply 59. The accelerating anode(s) is connected to the shielded leads 114*a* and 114. Since the shielded leads extending from the accelerating anode(s) and connected to the shielded leads 114 and 114*a* store up an electrostatic charge during the preceding short test, it is necessary to discharge the shielded leads just at the beginning of the gas test. This is effected by means of the fixed contact and the contactor of the time-delay relay 352 which shorts the shielded leads to ground at the beginning of the gas test and disconnects the shielded leads from ground after the necessary elapsed time through energization of the coil 352*a* of the time-delay relay 352. This is caused to happen by the switch deck 372 which connects the coil of the time-delay relay 352 in circuit with the fused supply line 56—58. With a difference of potential between the cathode and the focusing electrode of the electrostatic tube, cathode current flows therethrough and electrons also spray out further into the envelope of the tube ionizing gas molecules therein. Positive ions thus formed are supplied with electrons by the accelerating anode(s) of the cathode ray tube, thereby causing a current to flow through the grid-leak resistor at the input end of the low-level direct current differential amplifier 102. If sufficient current flows through the grid-leak resistor of the amplifier 102, the indicator bulb 105 connected to the output of the differential amplifier glows. The amount of cathode current for the gas test is adjusted by means of the meter 444 and the rheostat 442 in circuit with the cathode during the gas test. The meter 444 is provided with a fixed indicating mark which defines the arbitrarily selected cathode current suitably related to the input potential necessary at the differential amplifier for causing the indicator bulb 105 to glow for indicating a gassy tube. Little time is involved in performing this test. If the tube is gassy the indicator bulb 105 glows almost immediately.

To calibrate the gas test indicator circuit which includes the differential amplifier 102 and the indicator bulb 105, a direct current voltage equivalent to the maximum allowable gas ratio is applied to the differential amplifier and the gain is then adjusted by means of the potentiometer in the cathode circuit so that the indicator bulb 105 just fires. This calibrating voltage is obtained from a fixed divider which shunts the voltage regulator gas tube 92. The resistors comprising this divider are necessarily precision resistors. Calibrating voltage is applied to the input grid of the differential amplifier 102 by closing the push-button switch 106. Time delay relay 352 serves to ground all the shielded wiring at the initiation of the gas test so as to avoid false indications on the indicator bulb 105. If discharge stored in the shielded leads used for high voltage were not removed, the gas test indicator would light whenever the coils of the relays 119 and 121 became energized or deenergized. Flashing of the indicator bulb 105 in this manner would be confusing to the operating personnel.

When the contactors of the selector switch 360 is moved to position C, the test circuit is conditioned for the screen or operate test. The screen or operate test serves to indicate whether or not phosphor has flaked off the screen. During this test, the potential on the focusing electrode is adapted to be adjusted to indicate whether or not the focusing electrode is operating properly, or if a magnetic tube can be focused. When the contactor of the switch is moved from position B to position C, the coil of relay 462 and the coil of relay 352 are both deenergized. When the coil of relay 462 is deenergized, the coils of the high voltage relays 119 and 122 are reenergized whereby the high voltage supply 120 and the deflection circuit 222 is restored to operating condition. During this test deflection energy is applied to the deflection plates of the cathode ray tube by means of the deflection circuitry 212. The size of the raster is to be adjusted by adjusting the autotransformer 214. The over voltage relay 316 protects the vertical deflection coils 312 and 314 from damage by disconnecting them from their supply source, i. e., the secondary of transformer 222. Focus potential is varied by means of the potentiometer 390 to indicate whether or not the focusing electrode is operative. During this test proper bias is achieved through the cathode bias resistor 448 connected in circuit with the cathode by means of the switch deck 371. The heater filament is connected to the cathode by means of the switch deck 370. The accelerating anode(s) of the cathode ray tube is raised to the rated potential by connection to the proper terminal of the test circuit. Little time is needed for the performance of this test. The only adjustments include varying the autotransformer 214 to cause the size of the raster to correspond with the diameter on the particular tube being tested. It is instantly evident upon observing the raster whether or not any phosphor has flaked off the face of the cathode ray tube. Additionally, a rapid adjustment of the potentiometer 390 indicates whether or not the focusing electrode is operative, or if a magnetic tube focuses properly.

When the ganged contactors of the switch 360 are rotated into the D position, corresponding to the cutoff test, the heater remains connected to the cathode but the cathode is raised to a relatively high positive potential by connection to the terminal tap 173 between the resistors 172 and 174 of the bleeder. This is accomplished by means of the switch deck 370. Potential on the focusing electrode is not changed and the potential on the accelerating anode(s) is not changed. The screen is examined for light emission during the cutoff test.

When the ganged contactors of the selector switch 360 are moved to position E, the test circuit is conditioned for the emission test. During the emission test, only the switch decks 371 and 372 effect any change in the test circuit. The switch deck 371 acts to connect the meter 444 in series with the cathode. The switch deck 372 acts to energize the time-delay relay 454. During the emission test the tube is operated for a short time with zero bias. This corresponds to full emission. The time-delay relay serves to interrupt the cathode circuit after a period of time on the order of two seconds to prevent damage to the tube. The meter resistance is too small to act as a cathode biasing resistor and therefore the tube is operated at zero bias during this test. Before the time-delay relay 454 acts to interrupt the cathode circuit, the pointer of the meter 454 moves rapidly to the dial position corresponding to the emission current. The pointer stops either in the bad zone or the good zone of the scale of the meter 444. When the test is terminated the contactors of the switch 360 are rotated back to the position A or the short test position whereby the circuit is ready for another test. When the enclosure within which the tube is mounted is opened, the interlock switches 342 interrupt the energization circuit to the coils of the high voltage relays 119 and 121. Not only does this serve to interrupt the operation of the high voltage supply 120 and the deflection circuit 212, but it also acts to discharge any voltage that has been developed by condenser action on the shielded leads. This is accomplished through the contactor and the fixed contacts of the relays 352 which grounds all the shielded leads extending from the high voltage taps of the bleeder. This prevents operating personnel from being hurt.

The above operating conditions have been described in connection with electrostatic tubes. The operation of the circuit for electromagnetic tubes is similar, except that where the electromagnetic tubes have a tetrode gun, the screen grid of the tetrode gun is connected to one of the contactors of switch decks 362, 363, or 364. Additionally, since the electromagnetic tube has no focusing electrode, no connection is made to the terminal 385. Horizontal and vertical deflection terminals remain inactive during the test of an electromagnetic cathode ray tube since the magnetic deflection yoke 248 performs this function. The switch deck 361 acts to increase current through the focus coil during the operate and cutoff test corresponding to positions C and D by shorting out the portion 88 of the bleeder resistor across the low voltage power supply 59. Current through the focus coil 82 may be adjusted during tests of electromagnetic cathode ray tubes by adjustment of the rheostat 84.

The results obtained through the use of this circuit are positive and conclusive. No discretion is left to the operator. If indicator bulbs ignite or if the needle on the meter 444 does not move beyond the boundary between bad and good, the tube is bad for the reasons corresponding to those indications. During the operate test, examination of the screen for flaked off phosphor can lead to only one conclusion. If phosphor has flaked off, the dark spot should leave no doubt that the tube is bad. When the gas test is performed on electromagnetic cathode ray tubes the screen grid which operates at 350 volts in the embodiment described serves as the anode as compared to the focusing electrode which serves as the anode during the gas test on electrostatic cathode ray tubes. During the cutoff test, all of the operating voltages are applied to the tube elements except that the operating bias is removed and the cathode is raised to potential of about 250 volts relative to the control grid. This potential is over and above any maximum bias required to cut off completely any cathode ray tube. The tube is examined for screen excitation during this test. The bias placed on the cathode of this tube by the circuit may be scaled downwardly in accordance with test requirements without deviating from the spirit of this invention.

Obviously many modifications and variations of the present invention are possible in the light of the above teachings. It is therefore to be understood that within the scope of the appended claims the invention may be practiced otherwise than as specifically described.

We claim:

1. A cathode ray tube test circuit adapted for use in performing short, gas, operate, cutoff, and emission tests on electrostatic and electromagnetic cathode ray tubes, said test circuit comprising a low voltage power supply, said low voltage power supply including a focus coil, said focus coil being suitably arranged within said power supply whereby it is energized thereby and also aids in filtering the output of said power supply; a voltage regulator element connected in a shunt circuit across the output of said low voltage power supply for affording a constant difference of potential as a reference; a high voltage power supply including an output voltage adjustment means; a multisectional bleeder connected as a voltage dividing network across said high voltage power supply; a line adjust circuit including a tuning eye tube, connecting means in circuit between said line adjust circuit and said voltage regulator element and said bleeder, respectively, to aid in adjusting the output voltage of said high voltage power supply to a predetermined level; a low-level direct current amplifier connected to the output end of said low voltage power supply and adapted to be powered thereby, said amplifier including an input end and an output end; calibration means adapted to be connected between said voltage regulator element and the input end of said amplifier; indicator means connected to the output end of said amplifier; a deflection circuit for supplying deflection energy for electrostatic and electromagnetic cathode ray tubes; means for supplying the heating power to the filament of a cathode ray tube under test, a plurality of indicator means adapted for connection in circuit with elements of a cathode ray tube under test and with selected sections of said bleeder for indicating interelement shorts; additional indicator means adapted to be connected in circuit with the cathode of a cathode ray tube under test for indicating the emissive quality thereof during an emission test; shielded connecting means adapted to connect during a gas test, the input end of said amplifier and a large surface electrode of a cathode ray tube under test whereby an indication may be obtained as to whether or not gas content is excessive; means for permitting discharge of said shielded connecting means at the initiation of a gas test to avoid spurious indications; and circuit making and breaking means for conditioning said test circuit for each of the aforementioned tests.

2. A cathode ray tube test circuit adapted for use in performing short, gas, operate, cutoff, and emission tests on electrostatic and electromagnetic cathode ray tubes, said test circuit comprising a low voltage power supply; a focus coil adapted to be energized by said low voltage power supply; a voltage regulator element connected in a shunt circuit across the output of said low voltage power supply for affording a constant difference of potential as a reference; a high voltage power supply including an output voltage adjustment means; a multisectional bleeder connected as a voltage dividing network across said high voltage power supply; a line adjust circuit including a tuning eye tube, connecting means in circuit between said line adjust circuit and said voltage regulator element and said bleeder, respectively, to aid in adjusting the output voltage of said high voltage power supply to a predetermined level; a low-level direct current amplifier connected to the output end of said low voltage power supply and adapted to be powered thereby, said amplifier including an input end and an output end; calibration means adapted to be connected between said voltage regulator element and the input end of said amplifier; indicator means connected to the output end of said amplifier; a deflection circuit for supplying deflection energy for electrostatic and electromagnetic cathode ray tubes, said deflection circuit including an oscillator and a magnetic deflection yoke; means for supplying the heating power to the filament of a cathode ray tube under test, a plurality of indicator means adapted for connection in circuit with elements of a cathode ray tube under test and with selected sections of said bleeder for indicating interelement shorts; additional indicator means adapted to be connected in circuit with the cathode of a cathode ray tube under test for indicating the emissive quality thereof during an emission test; shielded connecting means adapted to connect the input end of said amplifier and a large surface electrode of a cathode ray tube under test during a gas test whereby an indication may be obtained as to whether or not gas content is excessive; means for permitting discharge of said shielded connecting means at the initiation of a gas test to avoid spurious indications, and circuit making and breaking means for conditioning said test circuit for each of the aforementioned tests.

3. A cathode ray tube test circuit adapted for use in performing short, gas, operate, cutoff, and emission tests on elestrostatic and electromagnetic cathode ray tubes, said test circuit comprising a low voltage power supply, said low voltage power supply including a focus coil and current adjustment means for said focus coil, said focus coil being suitably arranged within said power supply whereby it is energized thereby and also aids in filtering the output of said power supply; a voltage regulator element connected in shunt circuit across the output of said low voltage power supply for affording a constant difference of potential as a reference; a high voltage power supply including an output voltage adjustment means; a multitap bleeder connected as a voltage dividing network across said high voltage power supply; a line adjust circuit including a tuning eye tube, connecting means in circuit between said line adjust circuit and said voltage regulator element and one of the taps of said bleeder, respectively, to aid in adjusting the output voltage of said high voltage power supply to a predetermined level by comparison with a reference; a low-level direct current amplifier connected to said low voltage power supply and adapted to be powered thereby, said amplifier including an input end and an output end; indicator means connected to the output end of said amplifier; a deflection circuit for supplying deflection energy to cathode ray tubes; means for supplying the heating power to the filament of a cathode ray tube under test, a plurality of indicator means adapted for connection in circuit with elements of a cathode ray tube under test and with selected tap of said bleeder for indicating interelement shorts; additional indicator means adapted to be connected in circuit with the cathode of a cathode ray tube under test for indicating the emissive quality thereof during an emission test; shielded connecting means adapted to connect, during a gas test, the input end of said amplifier and a large surface electrode of a cathode ray tube under test whereby an indication may be obtained as to whether or not gas content is excessive; means for permitting discharge of said shielded connecting means at the initiation of a gas test to avoid spurious indications; and circuit making and breaking means for conditioning said test circuit for each of the aforementioned tests.

4. A cathode ray tube test circuit adapted for use in performing short, gas, operate, cutoff, and emission tests on electrostatic and electromagnetic cathode ray tubes, said test circuit comprising a low voltage power supply; a focus coil; said focus coil being suitably arranged within said power supply whereby it is adapted to be energized thereby over a range and aids in filtering the output of said power supply; a high voltage power supply including an output voltage adjustment means; a multitap bleeder connected as a voltage dividing network across said high voltage power supply; a low-level direct current amplifier connected to said low voltage power supply and adapted to be powered thereby, said amplifier including an input end and an output end; indicator means connected to the output end of said amplifier; a deflection circuit for supplying deflection energy to cathode ray tubes said deflection circuit including a variable transformer, first transformer means and second transformer means connected to the output end of said variable transformer, a pair of terminals coupled to the output end of said first transformer means and adapted for connection to the vertical deflection plates of an electrostatic cathode ray tube, a rectifier and filter connected to the output end of said first transformer means, a relay having a fixed contact and a movable contactor and a relay coil, said relay coil being connected to said filter whereby current flow therethrough increases as the output voltage at said filter increases, said contactor normally being in contact with said fixed contact and being separated therefrom when the output voltage at said filter increases beyond a predetermined level, a vertical deflection coil means connected in series with the output of said second transformer means and said contactor and said fixed contact, an oscillator including a tank circuit having horizontal deflection coil means, said oscillator being connected to said filter, and a pair of output terminals coupled to opposite ends of said horizontal deflection coil means and adapted for connection to the horizontal deflection plates of an electrostatic cathode ray tube, whereby said variable transformer is adjusted for a low output voltage when an electromagnetic cathode ray tube is being tested and said contactor remains engaged with said contact, and whereby said variable transformer is adjusted for a high output voltage when an electrostatic cathode ray tube is being tested and said contactor is disengaged from said contact to preclude damage to said vertical deflection coil means; means for supplying the heating power to the filament of a cathode ray tube under test; a plurality of indicator means adapted for connection in circuit with elements of a cathode ray tube under test and with selected taps of said bleeder for indicating interelement shorts; additional indicator means adapted to be connected in circuit with the cathode of a cathode ray tube under test for indicating the emissive quality thereof during an emission test; shielded connecting means adapted to connect, during a gas test, the input end of said amplifier and a large surface electrode of a cathode ray tube under test whereby an indication may be obtained as to whether or not gas content is excessive; means for permitting discharge of said shielded connecting means at the initiation of a gas test to avoid spurious indications; and circuit making and breaking means for conditioning said test circuit for each of the aforementioned tests.

5. A cathode ray tube test circuit adapted for use in performing short, gas, operate, cutoff, and emission tests on electrostatic and electromagnetic cathode ray tubes, said test circuit comprising a low voltage power supply; an adjustable focus coil connected to said power supply; a high voltage power supply including an output voltage adjustment means; a multitap bleeder connected as a voltage dividing network across said high voltage power supply to afford a plurality of test voltages; a constant voltage element connected in a shunt circuit across the output of said low voltage power supply for affording a constant difference of potential as a reference; a line adjust circuit including a tuning eye tube, connecting means in circuit between said line adjust circuit and said voltage regulator element and said bleeder, respectively, to aid in adjusting the output voltage of said high voltage power supply to a predetermined level; a low-level direct current amplifier connected to said low voltage power supply and adapted to be powered thereby, said amplifier including an input end and an output end; indicator means connected to the output end of said amplifier; a deflection circuit for supplying deflection energy to cathode ray tubes; means for supplying the heating power to the filament of a cathode ray tube under test; a plurality of indicator means adapted for connection in circuit with elements of a cathode ray tube under test and with selected taps of said bleeder for indicating interelement shorts; additional indicator means adapted to be connected in circuit with the cathode of a cathode ray tube under test for indicating the emissive quality thereof during an emission test; shielded connecting means adapted to connect, during a gas test, the input end of said amplifier and a large surface electrode of a cathode ray tube under test whereby an indication may be obtained as to whether or not gas content is excessive; and circuit making and breaking means for conditioning said test circuit for each of the aforementioned tests.

6. A cathode ray tube test circuit comprising means for providing power and test potentials; means for providing deflection energy, said last-mentioned means including a variable transformer, first transformer means and second transformer means connected to the output end of said variable transformer, a pair of terminals coupled to the output end of said first transformer means and adapted for connection to the vertical deflection plates of an electrostatic cathode ray tube, a rectifier and filter connected to the output end of said first transformer means, a relay having a fixed contact and a movable contactor and a relay coil, said relay coil being connected to said filter whereby current flow therethrough increases as the output voltage at said filter increases, said contactor normally being in contact with said fixed contact and being separated therefrom when the output voltage at said filter increases beyond a predetermined level, a vertical deflection coil means connected in series with the output of said second transformer means and said contactor and said fixed contact, an oscillator including a tank circuit having horizontal deflection coil means, said oscillator being connected to said filter, and a pair of output terminals coupled to opposite ends of said horizontal deflection coil means and adapted for connection to the horizontal deflection plates of an electrostatic cathode ray tube, whereby said variable transformer is adjusted for a low output voltage when an electromagnetic cathode ray tube is being tested and said contactor remains engaged with said contact, and whereby said variable transformer is adjusted for a high output voltage when an electrostatic cathode ray tube is being tested and said contactor is disengaged from said contact to preclude damage to said vertical deflection coil means; means for amplifying low-level direct current potentials developed by ion current during a gas test; indicator means; and circuit making and breaking means for sequentially arranging the test circuit in a plurality of combinations with a cathode ray tube to be tested thereby for affording indications through said indicator means of the quality of the cathode ray tube under operating conditions.

7. For use in a test circuit, a high voltage power supply including an output voltage adjustment means, a multisectional bleeder connected as a voltage dividing network across said high voltage power supply, a low voltage power supply, a voltage regulator element connected in shunt circuit across the output of said low voltage power supply for affording a constant difference of potential as a reference, a line adjust circuit including a tuning eye tube, and connecting means in circuit with said line adjust circuit and said voltage regulator element and said bleeder, respectively, to aid in adjusting the output voltage of said high voltage power supply to a predetermined level and to indicate any deviation therefrom.

8. For use in a cathode ray tube test circuit, a variable transformer, first transformer means and second transformer means connected to the output end of said variable transformer, a pair of terminals coupled to the output end of said first transformer means and adapted for connection to the vertical deflection plates of an electrostatic cathode ray tube, a rectifier and filter connected to the output end of said first transformer means, a relay having a fixed contact and a movable contactor and a relay coil, said relay coil being connected to said filter whereby current flow therethrough increases as the output voltage at said filter increases, said contactor normally being in contact with said fixed contact and being separated therefrom when the output voltage at said filter increases beyond a predetermined level, a vertical deflection coil means connected in series with the output of said second transformer means and said contactor and said fixed contact, an oscillator including a tank circuit having horizontal deflection coil means, said oscillator being connected to said filter, and a pair of output terminals coupled to opposite ends of said horizontal deflection coil means and adapted for connection to the horizontal deflection plates of an electrostatic cathode ray tube, whereby said variable transformer is adjusted for a low output voltage when an electromagnetic cathode ray tube is being tested and said contactor remains engaged with said contact, and whereby said variable transformer is adjusted for a high output voltage when an electrostatic cathode ray tube is being tested and said contactor is disengaged from said contact to preclude damage to said vertical deflection coil means.

References Cited in the file of this patent

UNITED STATES PATENTS 2,532,759 Coate ---------------- Dec. 5, 1950
2,632,134 Reid ---------------- Mar. 17, 1953